United States Patent [19]

Shimizu et al.

[11] Patent Number: 4,556,886
[45] Date of Patent: Dec. 3, 1985

[54] PHASE SHIFT TYPE LINEAR POSITION DETECTION DEVICE

[75] Inventors: Wataru Shimizu, Fuchu; Akira Yamashita, Komae, both of Japan

[73] Assignee: Kabushiki Kaisha S G, Tokyo, Japan

[21] Appl. No.: 348,674

[22] Filed: Feb. 16, 1982

[30] Foreign Application Priority Data

Feb. 20, 1981 [JP] Japan .............................. 56-22075[U]

[51] Int. Cl.[4] ........................ G08C 19/06; G01B 7/14
[52] U.S. Cl. ............................... 340/870.32; 324/166; 324/208
[58] Field of Search ...................... 340/870.31, 870.32; 324/208, 166; 336/45, 136

[56] References Cited

U.S. PATENT DOCUMENTS

| | | | |
|---|---|---|---|
| 2,469,137 | 5/1949 | Strong | 340/870.32 |
| 3,237,189 | 2/1966 | Wayman | 340/870.32 |
| 3,242,472 | 3/1966 | Anthony | 340/870.32 |
| 4,297,698 | 10/1981 | Pauwels et al. | 340/870.32 |
| 4,331,917 | 5/1982 | Render et al. | 324/166 |
| 4,355,364 | 10/1982 | Gudat | 340/870.32 |

Primary Examiner—James J. Groody
Attorney, Agent, or Firm—Spensley Horn Jubas & Lubitz

[57] ABSTRACT

About a bobbin, there are wound primary coils in axially displaced locations and wound also is a secondary coil. A core is linearly slidably provided in the bobbin. The primary coils are individually excited by AC signals which are out of phase with each other, e.g. a sine wave signal and a cosine wave signal. The secondary coil thereupon produces an output signal resulting from phase shifting the applied sine or cosine wave signal in accordance with a linear position of the core. Accordingly, the linear position can be detected by measuring phase difference between a reference AC signal and the output signal of the secondary coil. Likewise, velocity and acceleration change may be determined using the position change data.

19 Claims, 19 Drawing Figures

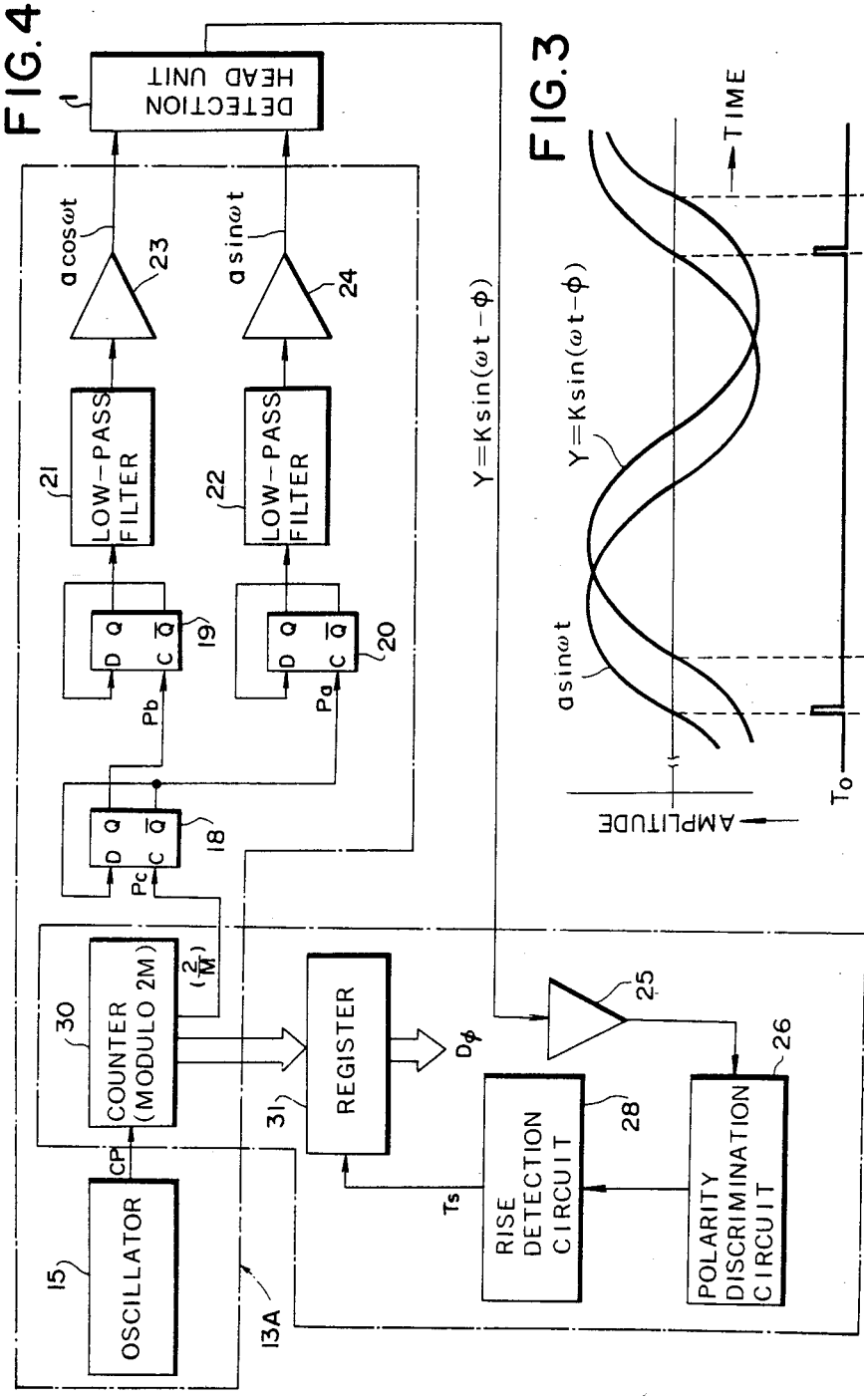

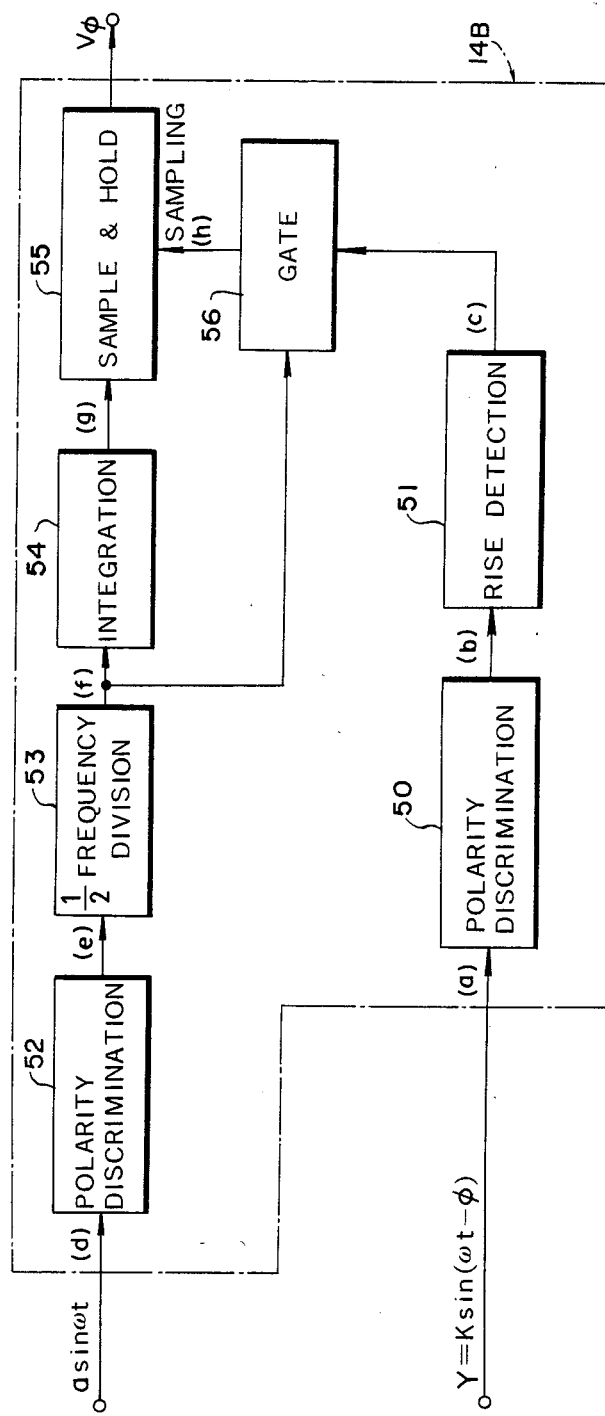

PHASE SHIFT TYPE LINEAR POSITION DETECTION DEVICE

BACKGROUND OF THE INVENTION

This invention relates to a linear position detection device and, more particularly, to a detection device including a detection head unit capable of phase-shifting or phase-modulating a reference AC signal is accordance with a linear position.

Known in the art of a linear type position detection device is a linear type differential transformer. A disadvantage in this differential transformer is that this device tends to cause errors due to disturbance, for it produces a voltage level corresponding to a linear position. For example, in this device, variation in resistance of a coil due to change in the temperature causes variation in the level of the detection signal. Reliability in this device is inadequate because attenuation of the level in signal transmission paths from the detector to a circuit utilizing the detection signal differs depending upon the distance of the transmission paths. Further, variation in the level due to noise is directly outputted as a detection error.

SUMMARY OF THE INVENTION

It is an object of the invention to provide a linear position detection device capable of accurately detecting a linear position without being affected by variation in the output level due to disturbance or other factors. For achieving this object, it is a feature of the present invention to construct a detection device in such a manner that primary coils and secondary coils in the known linear type differential transformer are disposed so that a plurality of primary coils are arranged along the direction of a linear displacement of a core, excite the respective primary coils individually by reference AC signals which are out of phase from one another to produce in a secondary coil an output signal which is phase-shifted in accordance with the linear position of the core and to detect the linear position of the core by measuring phase difference between the secondary coil output signal and the reference AC signal. Since the linear position is detected by measuring phase difference, the measurement is not affected by the variation in the output level due to disturbance and an accurate detection of position can be achieved. Further, resolution for detecting the linear position can be readily improved by increasing resolution for detecting phase difference by adopting a circuit arrangement in a phase difference detection circuit such, for example, as increasing a rate of a clock pulse used by a counter for measuring phase. The detection device made according to the invention, therefore, is suitable for purposes requiring high precision in the measurement.

It is another object of the invention to provide a high precision linear position detection device with an enlarged detection range. For this purpose, a plurality of cores are axially provided at a predetermined interval therebetween. Besides, four pairs of primary coils and secondary coils are provided, the first and second pairs being excited in opposite phase to each other by a sine wave signal whereas the third and fourth pair being excited in opposite phase to each other by a cosine wave signal. The respective coils are arranged so that reluctance passing through the respective coil pairs change depending upon the linear position of the core and the phase of the reluctance change is shifted by a predetermined phase angle between the respective coil pairs. The phase shift in the reluctance change between the first and second pairs and that between the third and fourth pairs typically is about 180°, i.e., opposite phase whereas the phase shift in the reluctance change between the first and third pairs and that between the second and fourth pairs is about 90°. Either the primary coil or the secondary coil may be commonly shared between the first and second pairs or between the third and fourth pairs.

BRIEF DESCRIPTION OF THE DRAWINGS

In the accompanying drawings,

FIG. 3 is a time chart showing an example of a phase difference measuring operation in the phase difference detection circuit;

FIG. 4 is a block diagram showing a modified example of the reference AC signal generation circuit and the phase difference detection circuit shown in FIG. 2;

FIG. 5 is a block diagram showing another modified example of the phase difference detection circuit shown in FIG. 2 in which phase difference is detected in analog value;

DESCRIPTION OF PREFERRED EMBODIMENTS

Figure 1:
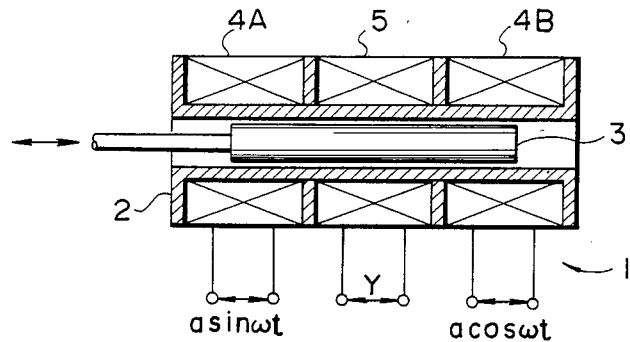
FIG. 1 is an axially sectional view of an example of a detection head unit of the linear position detection device according to the invention.

Referring to FIG. 1, a detection head unit 1 is substantially of the same construction as a conventional differential transformer except that relation between a primary coil and a secondary coil is reverse to the conventional construction. In the detection head unit 1, an axially displaceable core 3 is inserted in the hollow central portion of a bobbin 2. Two primary coils 4A and 4B are respectively wound on the bobbin 2 in axially spaced locations. A secondary coil 5 is wound in a suitable location on the bobbin 2 (e.g. in the center as in the illustrated example). The two primary coils 4A and 4B are separately excited by AC signals which are out of phase from each other (e.g. a sine wave a sin ωt and a cosine wave a cos ωt). In the secondary coil 5, there is produced a composite voltage of a voltage induced by the primary coil 4A on one hand and a voltage induced by the primary coil 4B on the other.

Since the Primary coils 4A and 4B are excited by the AC signals a sin ωt and a cos ωt which are out of phase from each other, a signal Y resulting from phase shifting or phase modulation of the AC signal sin ωt in accordance with position l of the core 3 is produced in the secondary coil 5. The principle of the production of the signal will now be described hereunder.

Designating the position of the core 3 as l, coupling coefficient x of the primary coils and the secondary coil is expressed as $$x = l/k \tag{1}$$

where k represents a constant determined depending upon factors including the number of winding of the coils and permeability of the core. By using the coupling coefficient x, the output signal Y of the secondary coil 5 is expressed in the following equation:

$$Y = a(1-x)\sin \omega t - a(1+x)\cos \omega t \tag{2}$$

In the above equation, it is assumed that a position in which mutual inductance of the primary coil 4A and the secondary coil 5 is in equilibrium with mutual inductance of the primary coil 4B and the secondary coil 5 is a zero position of the core 3 (i.e., L=0) and the mutual inductance at this position is 1. By substituting the equation (2) by $a(1-x) = A$ and $a(1+x) = B$, the equation (2) becomes $$Y = A \sin \omega t - B \cos \omega t \tag{3}$$

$$= \sqrt{A^2 + B^2} \left( \frac{A}{\sqrt{A^2 + B^2}} \sin \omega t - \frac{B}{\sqrt{A^2 + B^2}} \cos \omega t \right)$$

Since $\frac{A}{\sqrt{A^2 + B^2}}$ and $\frac{B}{\sqrt{A^2 + B^2}}$ in the equation (3) can be rewritten to $\frac{A}{\sqrt{A^2 + B^2}} = \cos \phi$ and $\frac{B}{\sqrt{A^2 + B^2}} = \sin \phi$, the equation (3) can be expressed as $$Y = \sqrt{A^2 + B^2} (\sin \omega t \cos \phi - \cos \omega t \sin \phi)$$

$$= \sqrt{A^2 + B^2} \sin(\omega t - \phi).$$

Restoring A, B and φ to their original forms, Y can be expressed as $$Y = \sqrt{2a^2(1+x^2)} \sin\left(\omega t - \cos^{-1}\frac{1-x}{\sqrt{2(1+x^2)}}\right) \tag{4}$$

If $\sqrt{2a^2(1+x^2)}$ is replaced by K and φ by

-continued $$\cos^{-1}\frac{1-x}{\sqrt{2(1+x^2)}}, \text{ i.e.,}$$

$$\sqrt{2a^2(1+x^2)} = K$$

$$\cos^{-1}\frac{1-x}{\sqrt{2(1+x^2)}} = \phi \tag{5}$$

the equation (4) can be rewritten to $$Y = K \sin(\omega t - \phi) \tag{6}$$

Accordingly, the output signal Y of the secondary coil 5 is an AC signal which is shifted in phase from the reference AC signal a sin ωt by φ. The phase difference φ is a function of x as shown in the equation (5) and x in turn is a function of the position l of the core 3. Consequently, by measuring the phase difference φ between the output signal Y of the secondary coil 5 and the reference AC signal sin ωt (or cos ωt), the position l of the core 3 can be obtained on the basis of the phase difference φ. In other words, if the equation (5) is solved with respect to x, x can be expressed by a function f(φ) using the phase difference φ as a variable, that is, the position l can be expressed using the function f(φ) and on the basis of the equation (1) as $$l = k \cdot f(\phi) \tag{7}$$

Figure 2:
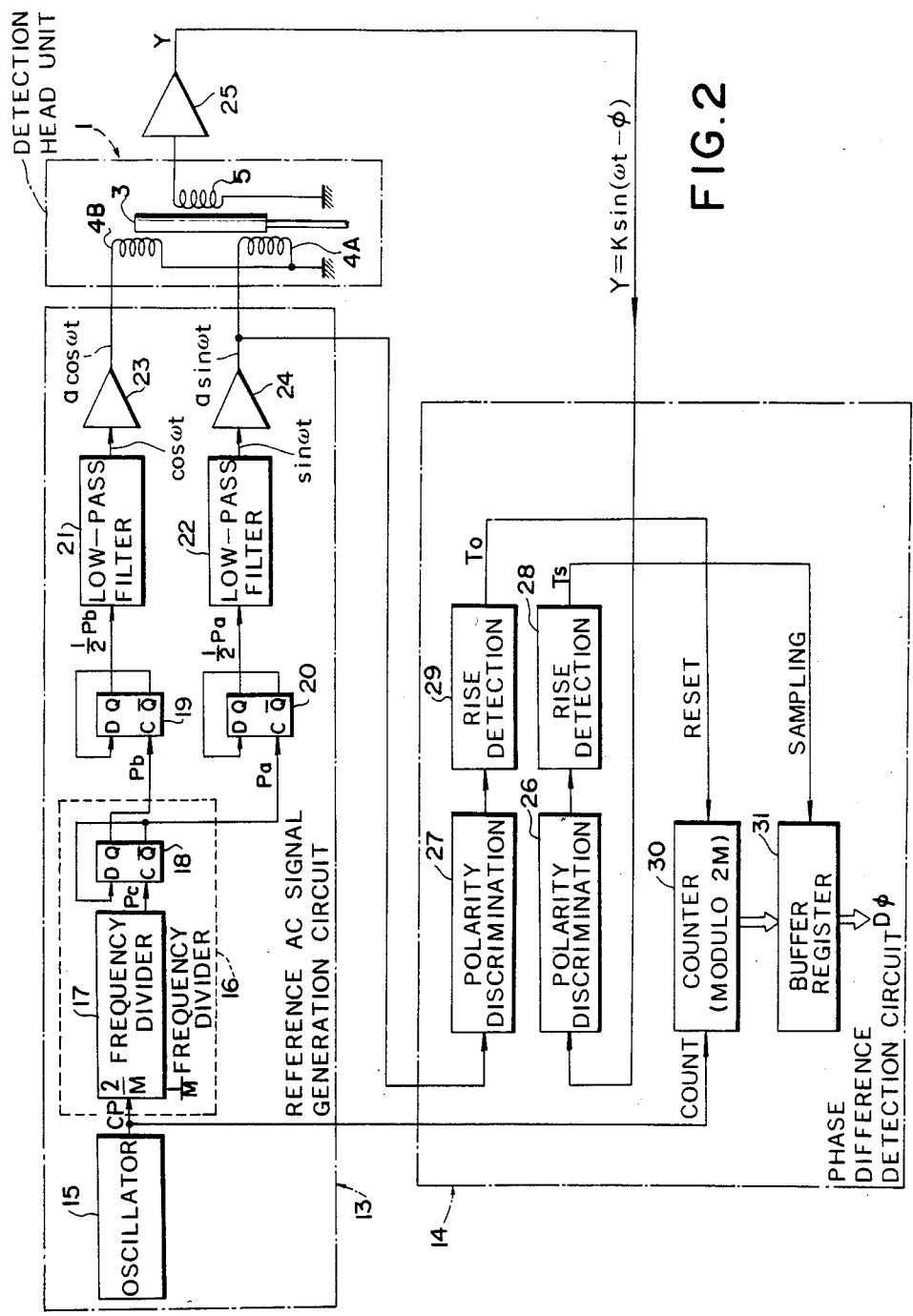
FIG. 2 is a block diagram showing an example of a reference AC signal generation circuit and a phase difference detection circuit in the linear position detection device.

An example of a circuit for obtaining the position l of the core 3 by measuring the phase difference φ between the output signal Y of the detection head unit 1 and the reference AC signal a sin ωt shown in FIG. 2. In FIG. 2 a reference AC signal generation circuit 13 generates an AC signal to be supplied to the primary coils 4A and 4B of the detection head unit 1. A phase difference detection circuit 14 is a circuit for measuring the phase difference φ. In the example shown in FIG. 2, the circuit 14 digitally measures the phase difference φ. An oscillator 15 oscillates a high-rate clock pulse CP. A frequency division circuit 16 frequency divides said clock pulse CP by M to output a duty 50% pulse Pb and an inverted signal Pa of said pulse Pb (M is any given integer). More specifically, the frequency division circuit, comprising a 2/M frequency divider 17 and a ½—frequency-dividing flip-flop circuit 18, obtains from the 2/M frequency divider 17 a pulse Pc namely, the 2/M—frequency-divided clock pulse CP and then frequency divides that pulse Pc by 2 through the flip-flop circuit 18. As a result, the flip-flop circuit 18 outputs a 50% duty cycle square wave pulse Pb with a one M-th the frequency of the clock pulse CP from the output (Q) and outputs a square wave pulse Pa namely, inverted pulse Pb from the inverted output (Q̄). The pulses Pb and Pa, one 180° out of phase with another, are applied to ½—frequency-dividing flip-flop circuits 19 and 20 respectively to halve the frequencies of the pulses Pb and Pa and obtain pulses ½Pb and ½Pa. It is noted that the pulses ½Pb and ½Pa which are respectively outputted from the flip-flop circuits 19 and 20 have a one 2M-th the frequency of the clock pulse CP and are 90° out of phase with one another.

The pulses ½Pb and ½Pa are applied to low-pass filters 21 and 22 respectively to obtain fundamental wave components. Suppose a cosine wave signal cos ωt is outputted from the low-pass filter 21, then a sine wave signal sin ωt is necessarily outputted from the low-pass filter 22. The signal cos ωt outputted from the low-pass filter 21 is amplified by an amplifier 23 to obtain the signal a cos ωt which in turn is applied to the primary coil 4B. The signal sin ωt outputted from the low-pass filter 22 is amplified by an amplifier 24 to obtain the signal a sin ωt which in turn is applied to the primary coil 4A.

As above mentioned, from the secondary coil 5 is obtained the AC signal Y=K sin (ωt−φ) which is shifted in phase with respect to the signal K sin ωt by the phase angle φ corresponding to the position l of the core 3. The output signal Y is applied through an amplifier 25 to a polarity discrimination circuit 26. To another polarity discrimination circuit 27 is applied one of the reference AC signal a sin ωt through the amplifier 24. The polarity discrimination circuit 26 and 27, composed of comparators, output "1" when the amplitude of the input signal (K sin (ωt−φ), a sin ωt) is of a positive polarity and output "0" when such amplitude is of a negative polarity.

The outputs from the polarity discrimination circuits 26 and 27 are respectively applied to rise detection circuits 28 and 29, namely, monostable multivibrators which output one shot of short pulse when the input signal rises to "1". Therefore, as shown in FIG. 3, when the phase angle (ωt−φ) of the output signal Y of the head unit 1 is 0°, the rise detection circuit 28 outputs a rise detection pulse Ts while, when the phase angle ωt of the reference AC signal a sin ωt is 0°, the rise detection circuit 29 outputs a rise detection pulse To. The signal Y=K sin (ωt−φ) behind the reference AC signal a sin ωt by a phase angle φ corresponding to the position l. Therefore, the rise detection pulse Ts follows the rise detection pulse To at a time interval corresponding to the phase difference φ.

It is possible to obtain data corresponding to the phase difference φ by counting the time interval between the rise detection pulses To and Ts with a counter 30 to which is applied the clock pulse CP sent by the oscillator 15. To the counter 30 is applied as a reset input the pulse To representing phase 0 of the reference AC signal a sin ωt. The counter 30, therefore, is reset every time the reference AC signal a sin ωt is in phase 0.

The output of the counter 30 is applied to a buffer register 31 to which is given as a sampling clock input a pulse Ts representing phase ωt−φ=0 of the signal K sin (ωt−φ). A count given by the counter 30 is transmitted to the buffer register 31 at every generation of the pulse Ts so that the buffer register 31 receives a count $D_\phi$ corresponding to the phase difference φ.

While it is possible to utilize the output $D_\phi$ of the buffer register 31 directly as data representing the position l, it is also possible to convert the phase shift data $D_\phi$ to data representing the position l by using a suitable function generator. For the purpose of reference, relationship between the phase shift φ and the position l is calculated as follows:

(1) When the position l is l=−k the coupling coefficient x is x=−1. Hence, $\phi = \cos^{-1} 1 = 0$.

(2) When the position l is l=0, the coupling coefficient x is x=0. Hence, $$\phi = \cos^{-1} \frac{1}{\sqrt{2}} = \frac{\pi}{4}.$$

(3) When the position l is l=k, the coupling coefficient x is x=1. Hence $\phi = \cos^{-1} 0 = \pi/2$.

It will be understood from the above example of calculation that the relationship between the phase shift φ and the position l is almost linear if the position l of the core 3 is within the range of −k≦l≦k. Since the detection head unit 1 is of a type which is adapted to detect a minute linear position, there is no inconvenience in limiting the range of the displacement of the core 3 to the order of −k≦l≦k. Accordingly, the data $D_\phi$ representing the phase shift φ can be utilized directly as the data representing the position l of the core 3. In this case, the origin of the core 3 should be considered not as the zero position (l=0), i.e., a neutral position, but as a position in which the phase shift φ is 0, i.e., the position l=k in the above example of calculation. In a case where the phase shift data $D_\phi$ is converted by a function generator to data representing the position l, the function generator can be constructed of a suitable device such as a read-only memory on the basis of the function employed in the equations (5) and (1).

The constructions of the reference AC signal generation circuit 13 and the phase difference detection circuit 14 are not limited to those shown in FIG. 2 but any other suitable circuit design may be employed for these circuits.

FIG. 4 shows an example wherein the 2/M frequency divider 17 shown in FIG. 2 is omitted while the counter 30 of modulo 2M is shared by a reference AC signal generation circuit 13A and the phase difference detection circuit 14A. In FIG. 4, the same reference figures as used in FIG. 2 designate circuits performing like functions. The bit with a one fourth the weight of the most significant bit, namely, an output at 2/M frequency division stage is applied to the flip-flop circuit 18 as pulse Pc. Based on that pulse Pc, the sine wave signal a sin ωt and cosine wave signal a cos ωt are generated through the circuits 18 to 24 as in the example shown in FIG. 2. The output signal Y=K sin (ωt−φ) of the detection head unit 1 is processed by the circuits 25, 26 and 28 as in the case shown in FIG. 2 and, as a result, the pulse Ts, which corresponds to said output signal Y in phase 0, is given to the sampling control input of the register 31. To the data input of the register 31 is given the count output of the counter 30. The digital data $D_\phi$ corresponding to the phase difference φ are thus memorized by the register 31 as in the example shown in FIG. 2.

While the data $D_\phi$ is obtained in digital by the phase difference detection circuits 14, 14A shown in FIGS. 2 and 4 respectively, they may be obtained in analog as shown in FIG. 5.

Figure 6:
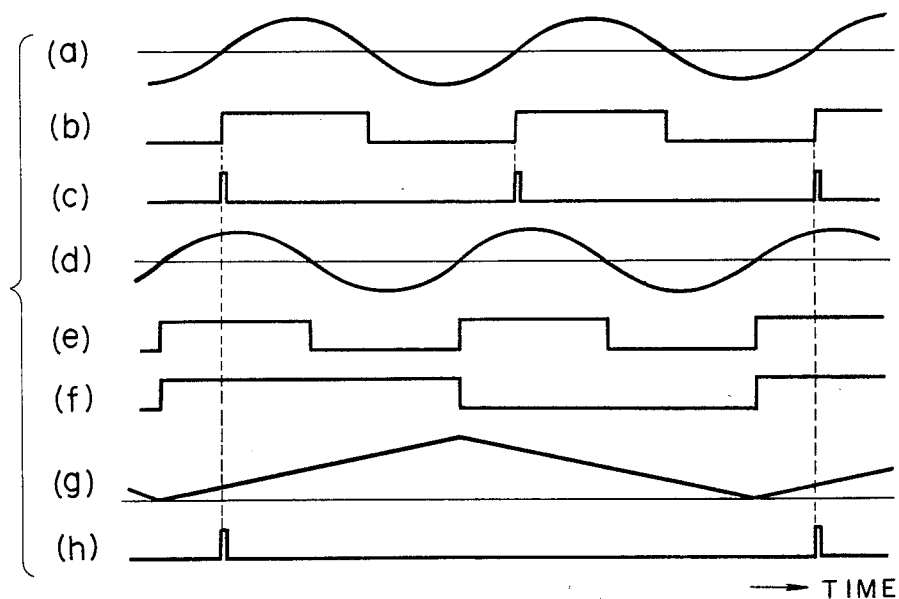
FIG. 6 is a time chart showing an example of waveforms of output signals appearing in the circuit portions shown in FIG. 5.
Figure 7:
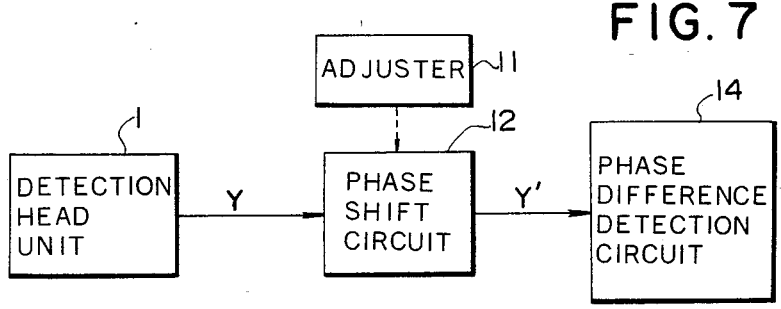
FIG. 7 is a block diagram showing an example in which a phase shift circuit for adjusting an origin is provided between the secondary coil output terminal and the phase difference detection circuit in the detection head unit.

In FIG. 5, to a phase difference detection circuit 14B are applied the reference AC signal a sin ωt and the output signal Y of the detection head unit 1. Supposing the output signal Y has a wave form as shown in FIG. 6(a), a polarity discrimination circuit 50 outputs "1" in response to a positive polarity and "0" in response to a negative polarity as shown in FIG. 6(b). A rise detection circuit 51 outputs short pulses as shown in FIG. 6(c) in response to the rise timing of the output (b) of the polarity discrimination circuit 50. The reference AC signal a sin ωt is rectified through the polarity discrimination circuit 52 as shown in FIG. 6(d), (e) and then applied to the ½ frequency division circuit 53 from which is obtained the output (f) that repeats "1" and "0" for every one cycle of the reference AC signal a sin ωt. The output (f) of the ½ frequency division circuit 53 is given to an integration circuit 54 to obtain an analog voltage signal (g) corresponding to the length of time elapsed as form the rise point or fall point of the frequency division circuit output (f) as shown in FIG. 6(g). The output (g) of the integration circuit 54 is applied to a sample and hold circuit 55 to be sampled at a timing of the phase angle of the signal Y=0°. To the sampling control input of the sample and hold circuit 55 is given an output (c) of the rise detection circuit 51 through a gate 56 which is enabled to allow the sample and hold circuit 55 to receive the output pulee (c) of the rise detection circuit 51 when the output (f) of the ½ frequency division circuit 53 is "1" but inhibits the pulse (c) when the output (f) is "0". The gate 56 is provided to inhibit the sampling of the negatively inclined output (g) which the integration circuit 54 gives when the output (f) of the ½ frequency division circuit 53 is "0" as shown in FIG. 6(g). Consequently, a sampling pulse (h) is sent to the circuit 55 through the gate 56 when the output (g) of the integration circuit 54 is of a positive inclination as shown in FIG. 6(h). The sample and hold circuit 55 thus carries out sampling every other cycle to output analog DC voltage $V_\phi$ corresponding to the phase difference $\phi$ between the reference AC signal a sin $\omega t$ and the detection head unit output signal Y.

In mounting the detection head unit 1 on an object for detection, it is difficult to accurately register the origin of the detection head unit 1 with that of the object for detection and there occurs more or less an error in mounting. For electrically correcting such error in registering the origin, a phase shift circuit 12 should preferably be provided between the detection head unit 1 and the phase difference detection circuit 14. The phase shift circuit 12 outputs a signal which is produced by shifting the input signal Y by a selected phase angle and is capable of adjusting the amount of phase shift by an adjuster 11. Adjustment of origins is made by this phase shift circuit 12 in the following manner. First, the position of the object for detection is set as the origin and the detection head unit 1 is mounted on the object for detection. If the origin of the detection head unit 1 is in perfect register with the origin of the object for detection, the output signal Y of the detection head unit 1 indicates the position for the origin (e.g. phase shift $\phi$ is 0). If there is an error in mounting, the output signal Y indicates the phase difference $\phi$ corresponding to the error. In this case, the adjuster 11 is manually operated to adjust the amount of phase shift in the phase shift circuit 12 so that a signal Y' outputted from the phase shift circuit 12 will indicate the position for the origin (e.g. so that the phase difference $\phi$ of this signal Y' relative to the reference signal a sin $\omega t$ will become 0). In other words, a phase adjustment is effected in the phase shift circuit 12 so as to cancel the phase difference produced in the signal Y due to the error in mounting. For example, the amount of phase shift can be varied by adjusting a variable resister in the phase shift circuit 12 by means of the adjuster 11 and thereby controlling time constant of the phase shift circuit 12.

In case the core 3 moves with the lapse of time, the velocity and acceleration of the movement of the core 3 can be obtained on the basis of the output signal Y of the detection head unit 1. When the core 3 is displaced in accordance with a function of time t, the phase difference $\phi$ of the output signal Y relative to the reference signal a sin $\omega t$ also varies with time and, accordingly, the phase difference $\phi$ in the equation (6) can be expressed by a function $\phi(t)$ of time as shown in the following equation (8):

$$Y = K \sin\{\omega t - \phi(t)\} \tag{8}$$

If the angular velocity of the amount of phase difference $\phi(t)$ is represented by $\omega_M$, $$(d/dt)\phi(t) = \omega_M \tag{9}$$

is established and, as the integral of the angular velocity $\omega_M$ corresponds to the phase difference $\phi(t)$, Equation (8) can be rewritten as, $$Y = K \sin\{(\omega - \omega_M)t - \phi_0\} \tag{10}$$

wherein $\phi_0$ indicates the initial phase.

If, on the other hand, the angular acceleration of the amount of phase difference $\phi(t)$ is represented by $a_M$, $$\frac{d}{dt}\phi(t) = a_M t \tag{11}$$

hence, $$\phi(t) = \int a_M t \, dt = \frac{a_M}{2} t^2 - \phi_0 \tag{12}$$

Equation (8), therefore, can be rewritten as, $$Y = K \sin\left\{\left(\omega - \frac{a_M}{2}\right)t - \phi_0\right\} \tag{13}$$

Figure 8:
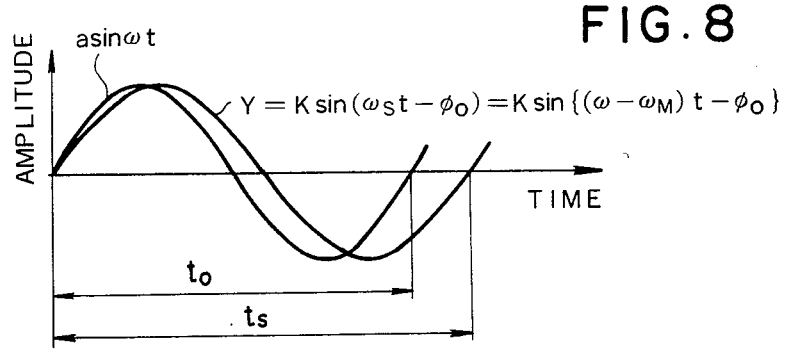
FIG. 8 is a waveform diagram showing an example of a detection head output signal produced when the core of the detection head unit in FIG. 1 has been displaced at a certain velocity.

An example of the output signal Y of the detection head unit 1 when the phase difference $\phi(t)$ is produced at the angular velocity $\omega_M$ is shown in FIG. 8. For convenience of explanation, an initial phase $\phi_0$ is made 0 in the example of FIG. 8. In FIG. 8, there is also shown the reference AC signal a sin $\omega t$. The reference character $t_0$ represents one cycle of the reference AC signal and $t_s$ one cycle of a detection head output signal Y. As will be apparent from FIG. 8 and the equation (10), the frequency of the detection head output signal Y is deviated from a reference frequency $\omega$ and the amount of deviation corresponds to the angular velocity $\omega_M$. If the frequency of the detection head output signal Y is represented by $\omega_s$, the equation (10) can be rewritten as, $$Y = K \sin\{(\omega - \omega_M)t - \phi_0\} = K \sin(\omega_s t - \phi_0) \tag{14}$$

That is, the frequency $\omega_s$ is $\omega_s = \omega - \omega_M$ and the angular velocity $\omega_M$ is.

$$\omega_M = \omega - \omega_s = 2\pi \left|\frac{1}{t_0} - \frac{1}{t_s}\right| \tag{15}$$

Accordingly, the angular velocity $\omega_M$ can be obtained by calculating the one cycle $t_s$ of the detection head output signal Y and obtaining result of operation of $t_s$ and the reference cycle $t_0$.

Specifically, $t_s$ is obtained by counting one cycle of the detection head output signal Y by the clock pulse CP. Letting the count value corresponding to $t_s$ be $n_s$ and letting one cycle of the clock pulse CP be T(sec.), $$t_s = n_s T \tag{16}$$

The one cycle $t_0$ of the reference signal a sin $\omega t$ is previously known and the equation (15) can be rewritten as, $$\omega_M = 2\pi \frac{1}{n_0 \cdot T} - 2\pi \frac{1}{n_s \cdot T} \quad (17)$$

$$= \frac{2\pi(n_s - n_0)}{T \cdot n_0 \cdot n_s}$$

where $n_0$ represents a count of the clock pulse CP corresponding to the one cycle $t_0$.

Since $2\pi$, T and $n_0$ are constants, the angular velocity $\omega_M$ can be obtained by counting one cycle of the detection head output signal Y and calculating the equation (17) on the basis of this count $n_s$.

Between the angular acceleration $\alpha_M$ and angular velocity $\omega_M$ can be established the following relation.

$$\alpha_M = \frac{d}{dt} \omega_M \simeq \frac{\Delta \omega_M}{t} \quad (18)$$

wherein $\Delta \omega_M$ is the amount of change in the angular velocity $\omega_M$ during time change $\Delta t$. Letting the angular velocity at a time $t_1$ be $\omega_{M1}$ and letting the angular velocity at a time $t_2$ which is $t_s$ second later than $t_1$ be $\omega_{M2}$, $$\Delta t = t_s$$

$$\Delta \omega_M = \omega_{M2} - \omega_{M1}$$

and since $t_s = n_s$, T from Equation (16), Equation (18) can be rewritten as, $$\alpha_M = \frac{\omega_{M2} - \omega_{M1}}{t_s} \quad (19)$$

$$= -\frac{\omega_{M2} - \omega_{M1}}{n_s \cdot T}$$

The angular acceleration $\alpha_M$, therefore, can be calculated by detecting the angular velocity $\omega_M$ for every one cycle $t_s$ of the detection head output signal Y to find the difference between the angular velocity $\omega_{M2}$ and the angular velocity $\omega_{M1}$, and dividing that difference by the product of the count $n_s$ and the period T of the clock pulse CP.

Design of a circuit for counting one cycle $t_s$ of the output signal Y of the detection head unit 1 and operating the equations (17) and (19) will be obvious from the above description.

Figure 9:
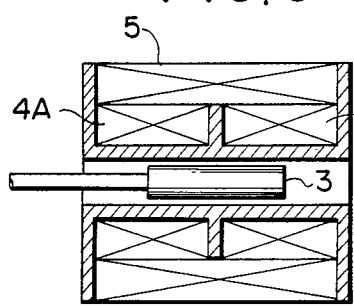
FIGS. 9 through 14 are axially sectional views respectively showing other examples of the detection head unit of the invention.
Figure 10:
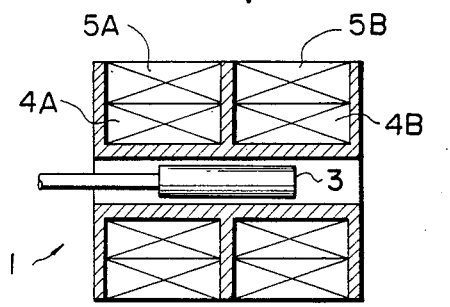
Figure 11:
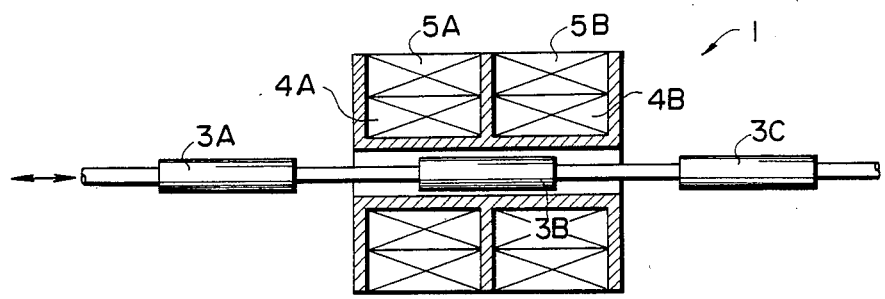

Relative location of the coils 4A, 4B and 5 in the detection head unit 1 is not limited to the type shown in FIG. 1 but other location may be employed. For example, a double winding type as shown in FIG. 9 in which the secondary coil 5 is provided inside or outside of the primary coils 4A and 4B may be adopted. In this case, instead of the single secondary coil 5, a pair of secondary coils 5A and 5B may be provided in correspondence to the primary coils 4A and 4B as shown in FIG. 10. In the example of FIG. 10, a sum of the outputs of the secondary coils 5A and 5B constitutes the detection head output signal Y. Conversely to the example of FIG. 10, the secondary coils 5A and 5B may be provided inside of the primary coils 4A and 4B. In the example of FIG. 10, a wire of a primary coil and that of a secondary coil may be wound together in a by-filer winding style instead of separately winding the inside secondary coils 5A, 5B and the outside primary coils 4A, 4B. Examples which have improved the coil constructions shown in FIG. 1, 9 or 10 for achieving a more accurate measurement and completely enlarging the measurable range are shown in FIGS. 12, 13 and 14.

Figure 12:
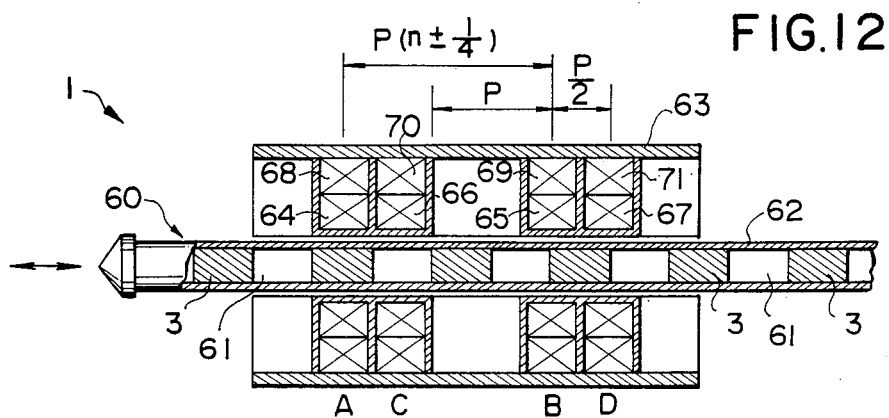
Figure 13:
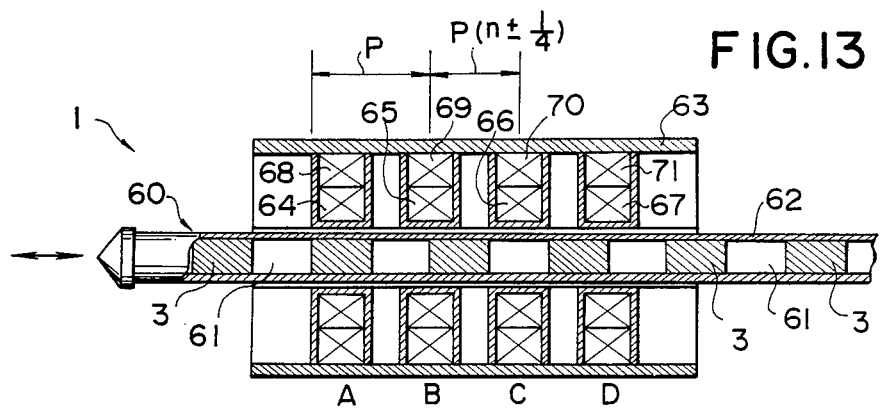
Figure 14:
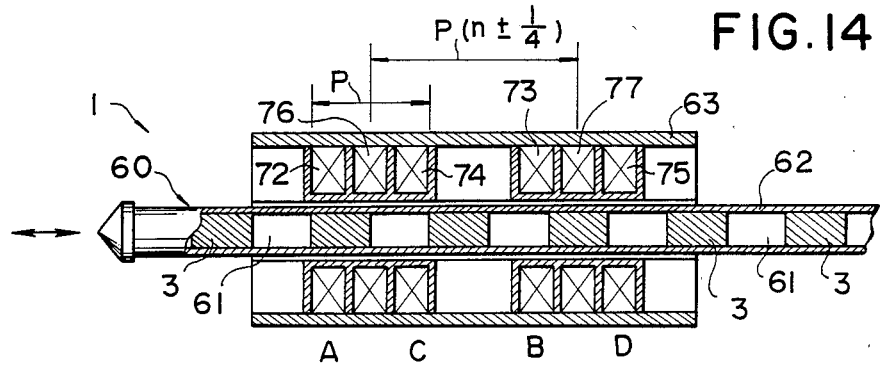

In the examples of FIGS. 12, 13 and 14, a slider 60 includes a plurality of cores 3 provided in an axially spaced relation with each other, spacers 61 provided between each of these cores 3 and a sleeve 62 enclosing these cores 3 and spacers 61. This slider 60 is linearly displaced in accordance with a linear movement provided from the outside as an object for detection. The cores 3 are made of a magnetic substance and the spacers 61 by a nonmagnetic substance. The axial length of each core 3 is equivalent to the axial length of each spacer 61 and this length is expressed by p/2 (p being any selected number). Accordingly, the distance for 1 pitch in the arrangement of the core 3 is P. Primary coils and secondary coils are provided in a casing 63 and the slider 60 which is inserted in hollow central portions of these coils is axially and linearly displaceable. These coils are provided in such a manner that they operate in four phases. These phases are expressed by A, B, C and D for the sake of convenience. Reluctance of these phases produced by the cores 3 is out of phase by 90° from each other, i.e., the phase A is, for example, a cosine phase, the phase B a sine phase, the phase C a negative cosine phase and the phase D a negative sine phase, respectively.

In the examples shown in FIGS. 12 and 13, the length of one coil is almost equivalent to the length of the core 3, i.e., p/2. In these examples, the primary coils 64, 65, 66 and 67 and the corresponding secondary coils 68, 69, 70 and 71 of the respective phases A, B, C and D are provided in the saxe axial locations. In the example of FIG. 12, the coils 64 and 68 of the phase A are disposed contiguously to the coils 66 and 70 of the phase C and the coils 65 and 69 of the phase B are disposed contiguously to the coils 67 and 71 of the phase D. The interval between the coils of the phase A and the phase B or the interval between the coils of the phase C and the phase D is $P(n \pm \frac{1}{4})$ (n being any natural number). In the example of FIG. 13, the coils 64–67 and 68–71 are disposed in sequence in the order of A, B, C and D with an equal interval between adjacent coils and the interval between the centers of the adjacent coils is $P(n \pm \frac{1}{4})$.

The detection head units 1 illustrated in FIGS. 12 and 13 operate entirely in the same manner. Reluctance of each magnetic circuit in the phases A, B, C and D changes as the slider 60 moves in a linear sliding movement, the phase of the change in reluctance being shifted by 90° between the respective adjacent phases. If, accordingly, such change in reluctance is realized, the location of the coils is not necessarily limited to those shown in FIGS. 12 and 13. In the examples of FIGS. 12 and 13, the primary coils 64–67 and the secondary coils 68–71 are provided independently but the priamry and secondary coils may be made together in the by-filer-winding style as previously described.

In the example shown in FIG. 14, secondary coils 72, 73, 74 and 75 for the phases A, B, C and D are separately provided, a single primary coil 76 is commonly used for the phases A and C and a single primary coil 77 is commonly used for the phases B and D. The total length of the coil group 72, 76 and 74 of the phases A and C is P and the total length of the coil group 73, 77 and 75 for the phases B and D is also P. The interval between centers of the coil group 72, 76 and 74 and the coil group 73, 77 and 75 is P(n±¼). By this arrangement, reluctance of the respective phase A, B, C and D is caused to change with a phase shift of 90° in accordance with the linear displacement of the slider 60 or in the same manner as in the examples of FIGS. 12 and 13.

Figure 15:
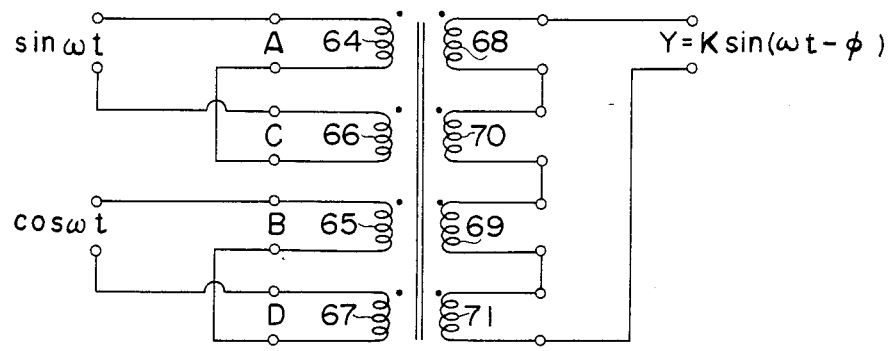
FIGS. 15 and 16 are circuit diagrams showing manners of connection of the coils in the examples shown in FIGS. 12 and 13.
Figure 16:
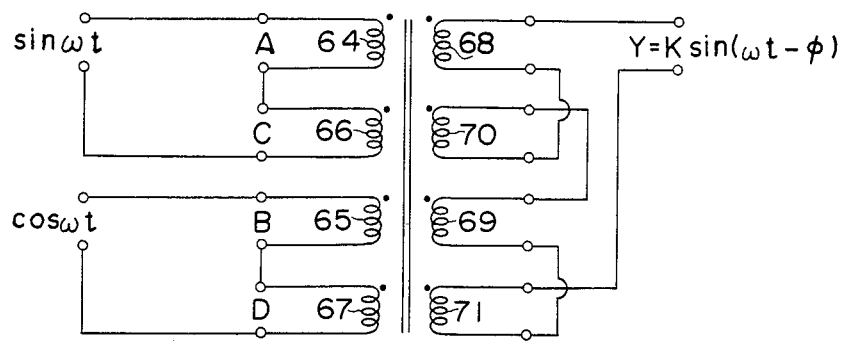

The primary coils 64–67 and secondary coils 68–71 in FIGS. 12 and 13 are connected in a manner shown in FIG. 15 or FIG. 16. FIG. 15 shows a connection in which the primary coils 64 and 66 of the phases A and C are excited in opposite phase to each other by a sine signal sin ωt and the outputs of the secondary coils 68 and 70 are added together in the same phase. Likewise, the primary coils 65 and 67 in the phases B and D are excited in opposite phase to each other by a cosine signal cos ωt and the outputs of the secondary coils 69 and 71 are added together in the same phase. By adding the output of the phases A and C and the output of the phases B and D together, an output signal Y=K sin(ωt−φ) which is the same signal as in the equation (6) is obtained. FIG. 16 shows a connection in which the coils of the phases A and C (or B and D) are excited in opposite phase as in the one shown in FIG. 15 but, contrary to that shown in FIG. 15, the primary coils are wound in the same phase and the secondary coils in opposite phase, and an output signal Y=K sin (ωt−φ) the same one as in the equation (6), is obtained.

Figure 17:
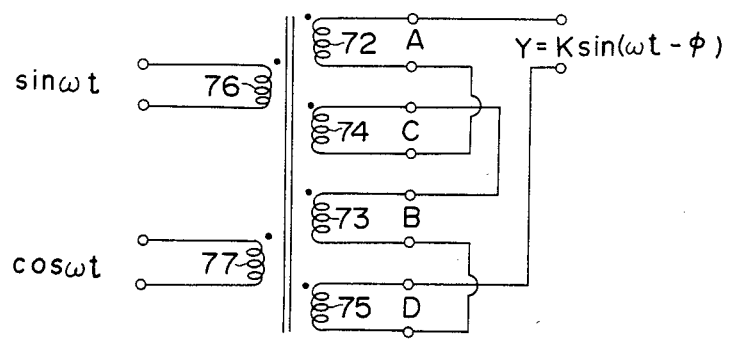
FIG. 17 is a circuit diagram showing a manner of connection of the coils in the example shown in FIG. 14.

The coils of FIG. 14 are connected in a manner shown in FIG. 17. The primary coils 76 for the phases A and C are excited by a sine signal sin ωt and the other primary coil 77 is excited by the cosine signal cos ωt. The secondary coils of the corresponding phases A, C and B, D are respectively connected in opposite phase and the outputs of these secondary coils are added together in the same phase to produce an output signal Y=K sin (ωt−φ).

In the FIGS. 12 through 17, the output signal Y is shifted in phase by the phase angle φ corresponding to the sliding position of the slider 60 (i.e., the core 3), for reluctance of the respective phases A–D is shifted in phase by 90° from each adjacent phase (A–D). If the phase angle corresponding to the linear position l is represented by φ, a function of the reluctance change in each of the phases A–D can be expressed by cos φ for the phase A, sin φ for the phase B, −cos φ for the phase C and −sin φ for the phase D and, accordingly, phase shifting according to φ can be effected by adding together signals obtained by modulating these functions by a sine or cosine wave. The phases A and C or the phase B and C, respectively constituting a pair, contribute to deepen the modulation factor differentially and thereby to reinforce the output signal level and improve accuracy in measuring. If accuracy in measuring is not particularly required, the coils for the phases C and D may be omitted.

In the examples shown in FIGS. 12 through 14, the measurable range can be enlarged limitlessly. Since, however, one cycle, i.e., 2π radian, of the phase shift φ in the output signal Y corresponds to the distance P for 1 pitch of the core 3, only a relative linear position within the range of the distance P can be obtained. It should be noted, however, that accuracy in measuring by this arrangement is extremely high. If an absolute linear position over a wide range is to be detected, another detection device of a relatively coarse accuracy having the distance P as a minimum unit may be provided additionally to the detection device according to the present invention so that the output of the former may be combined with the output of the latter.

As mentioned above, the velocity and acceleration of the movement of the core 3 can be obtained on the basis of the output signal Y of the detection head unit 1 in FIGS. 12–14.

Figure 18:
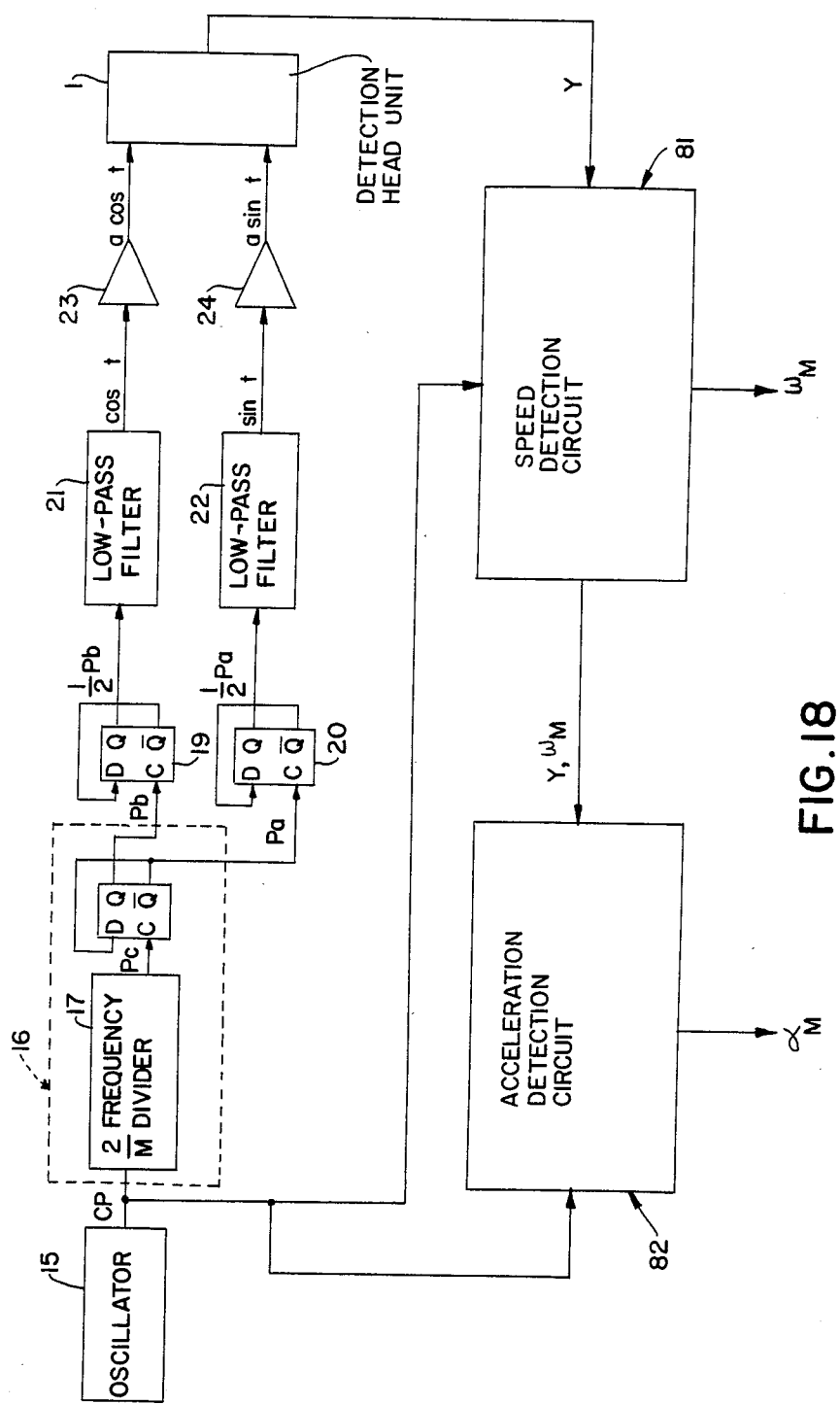
FIG. 18 is a block diagram showing the detection of speed and acceleration in response to the output signal from the detection head unit.

In FIG. 18, blocks 15 through 24 are provided to supply the primary coils of the detection head unit 1 with the sine wave signal a sin t and cosine wave signal a cos t and are each identical to the blocks with the same reference numerals forming the REFERENCE AC SIGNAL GENERATION CIRCUIT 13 shown in FIG. 2. The SPEED DETECTION CIRCUIT 81 is provided to obtain the speed based on the output signal Y of the detection head unit 1 and the clock pulse signal CP. The ACCELERATION DETECTION CIRCUIT 82 performs the operation of equation (19) on the basis of the velocity data obtained by the SPEED DETECTION CIRCUIT 81, thereby to find the acceleration $a_M$. The circuit details of the SPEED DETECTION CIRCUIT 81 and the ACCELERATION DETECTION CIRCUIT 82 are not shown as being obvious to one skilled in the art.

Figure 19:
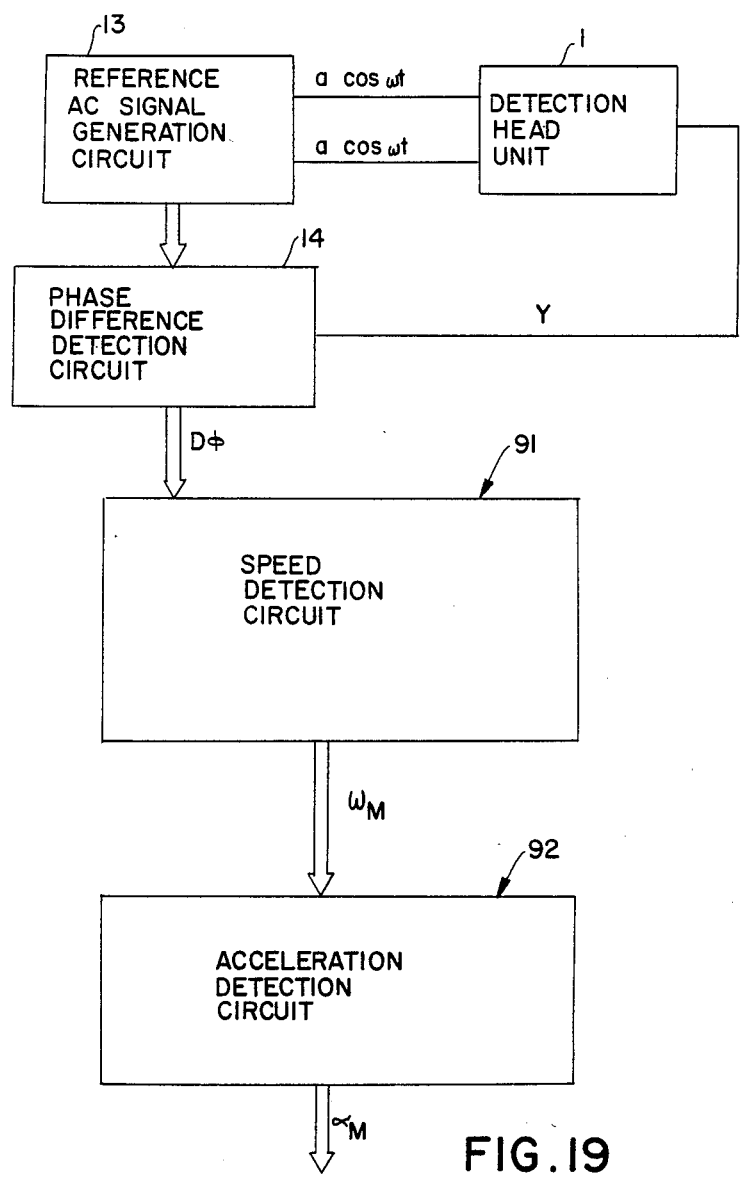
FIG. 19 is another example of detecting the speed and acceleration.

FIG. 19 shows the detection of the speed or velocity $\omega_M$ on the basis of the change of the amount of phase difference 0(t), as is readily appreciated from equation (9). The REFERENCE AC SIGNAL GENERATING CIRCUIT 13 and PHASE DIFFERENCE DETECTION CIRCUIT 14 shown in FIG. 19 are each identical to the blocks shown in FIG. 2 with the identical numerals. The phase difference data Dφ detected by the PHASE DIFFERENCE DETECTION CIRCUIT 14 and the clock pulse signal CP are used to detect the speed and acceleration, the acceleration being detected on the basis of the change of the speed. The details of the circuitry in the SPEED DETECTION CIRCUIT 91 and ACCELERATION DETECTION CIRCUIT 92 are not shown as being obvious to one skilled in the art.

In the above described examples, there is provided, though not particularly illustrated, a mechanism for holding the core 3, 3A, 3B, or 3C shown in FIGS. 1, 9, 10 or 11 or the slider 60 shown in FIGS. 12, 13 or 14 slidably against the body or casing 63 to which the coils are secured. Further, returning means for returning the cores 3, 3A, 3B and 3C or the slider 60 to the 0 position, e.g. a spring, may be added. For example, the spring as the returning means may be so constructed that it is stretched when it has returned to the 0 position, compressed when the object for detection has been displaced to a certain position from the 0 position and, when the object for detection has been displaced to another position toward the 0 position, is stretched to the extent of the displacement. By such arrangement, the core 3 may be linearly displaced following the linear movement of the object for detection. Instead of using the spring, the core 3 or the slider 60 may be directly coupled to the object for detection.

The core 3 need not be of a cylindrical shape as shown in the above examples but may be of any shape so long as it is capable of producing reluctance change such as sin φ or cos φ.

What is claimed is:

1. A phase shift type linear position detecton device comprising:
   at least two primary coils spaced away from each other by a predetermined distance in the linear displacement direction and excited individually by reference AC signals having a predetermined phase difference 360°/D except 180° or 360°;

secondary coils provided in correspondence to said respective primary coils; and a plurality of core elements of the same configuration fixed to each other with a predetermined pitch distance P in the linear displacement direction and being capable of relative linear displacement with respect to said primary and secondary coils, and each being capable of producing reluctance or permability, depending upon the position relative to said respective primary coils, in respective magnetic circuits of said respective primary coils;

the distance of spacing between said respective primary coils being $P(n\pm1/D)$ (where n is any integer) in accordance with the phase difference 360°/D of the exciting AC signals for said respective primary coils and distance P of one pitch of the arrangement of said core elements, whereby the reluctance of a magnetic circuit of each of said primary coils changes cyclically, with a displacement of one pitch of the arrangement of said core elements constituting one cycle thereof and with the reluctance changes of the magnetic circuits of respective primary coils being out of phase by an amount corresponding to the electrical phase difference between respective exciting AC signals, AC signals induced in said respective secondary coils being summed to produce an output AC signal and this output AC signal having an electrical phase depending upon the relative linear position within the range of one pitch of the arrangement of said core elements.

2. A phase shift type linear position detecton device as defined in claim 1 which, in association with said primary coils (namely first primary coils) and said secondary coils (namely first secondary coils), further comprises:

second primary coils for individually constituting pairs with said respective first primary coils, said second primary coils being spaced from said corresponding first primary coils by $mP+P/2$ (m being 0 or any natural number) in the linear displacement direction and being individually excited by AC signals which are in phase or of opposite phase with the exciting AC signals for said corresponding first primary coils; and second secondary coils provided in correspondence to said respective second primary coils.

3. A phase shift type linear position detection device as defined in claim 2 wherein said respective second primary coils are individually excited by AC signals which are in phase with the exciting AC signals for said corresponding first primary coils and outputs of first and second secondary coils corresponding respectively to first and second primary coils which constitute a pair are added together in opposite phase.

4. A phase shift type linear position detection device as defined in claim 2 wherein said respective second primary coils are individually excited by AC signals which are opposite in phase with the exciting AC signals for said corresponding first primary coils and outputs of first and second secondary coils corresponding respectively to first and second primary coils which constitute a pair are added together in phase.

5. A phase shift type linear position detection device as defined in claim 1 wherein each of said secondary coils provided in correspondence to said respective primary coils consists of a pair of a first secondary coil and a second secondary coil, locations of said first and second secondary coils are determined such that reluctance or permeability of the magnetic circuit of said first secondary coil and that of said second secondary coil change with an opposite characteristic in accordance with relative displacement of said core elements, and output signals of a first secondary coil and a second secondary coil which constitute a pair are added together in opposite phase.

6. A phase shift type linear position detection device as defined in claim 1 wherein the number of said primary coils is two and the phase difference 360°/D of said reference AC signals is 90° (i.e., D=4) and the distance $P(n\pm1/D)$ between said respective primary coils therefore is $P(n\pm\frac{1}{4})$.

7. A phase shift type linear position detection device as defined in claim 2 wherein the number of said first primary coils is two and the number of said second primary coils is also two and the phase difference 360°/D of the reference AC signals is 90° (i.e., D=4) and the distance $P(n\pm1/D)$ between said respective primary coils therefore is $P(n\pm\frac{1}{4})$.

8. A phase shift type linear position detection device as defined in claim 7 wherein said $P(n\pm\frac{1}{4})$ is $P(2-\frac{1}{4})$ and said $mP+P/2$ is $P/2$.

9. A phase shift type linear position detection device as defined in claim 7 wherein said $P(1\pm\frac{1}{4})$ is $P(1-\frac{1}{4})$ and said $mP+P/2$ is $P+P/2$.

10. A linear position detection device as defined in claim 1 wherein said core elements are arranged in such configuration and location that reluctance change for one cycle of trigonometric function will be produced for linear displacement corresponding to one pitch of the arranged core elements.

11. A linear position detection device as defined in claim 10 wherein said core elements are of a cylindrical configuration of a predetermined length and are arranged in sequence with space or a spacer having length approximately equivalent to the length of each core element being provided between the respective adjacent core elements.

12. A linear position detection device as defined in claim 1 which further comprises reference AC signal generation means for generating the reference AC signals which are out of phase with each other so as to supply these signals to the primary coils and phase difference detection means for detecting phase difference between one of the reference AC signals and said output AC signal.

13. A linear position detection device as defined in claim 12 which further comprises speed detection means for detecting the speed of the linear displacement of said core elements in response to difference in frequency or period between the reference AC signals and said output AC signal.

14. A linear position detection device as defined in claim 13 which further comprises acceleration detection means for obtaining an amount of change in the speed having been detected by said speed detection means so as to detect acceleration of the linear displacement of said core elements in accordance with the amount of change in the speed.

15. A linear position detection device as defined in claim 10 which further comprises speed detection means for detecting the speed of the linear displacement of said core elements on the basis of the change of said detected phase difference.

16. A linear position detection device as defined in claim 15 which further comprises acceleration detection means for obtaining an amount of change in the speed having been detected by said speed detection means so as to detect acceleration of the linear displacement of said core elements in accordance with the amount of change in the speed.

17. A phase shift type linear position detection device as defined in claim 1 wherein the number of said primary coils is three and the phase difference 360°/D of said reference AC signals is 120° (i.e., D=3) and the distance P(n±1/D) between said respective primary coils is P(n±⅓).

18. A phase shift type linear position detection device as defined in claim 2 wherein the number of said first primary coils is three and the number of said second primary coils is also three and the phase difference 360°/D of the reference AC signals is 120° (i.e., D=3) and the distance P(n±1/D) between said respective primary coils therefore is P(n±⅓).

19. A phase shift type linear position detection device comprising:

a slider having a plurality of spaced cores each approximately P/2 in length, said cores having a pitch distance of P and exhibiting a magnetic permeability characteristic, a set of primary and secondary annular coils disposed in a fixed coaxial relationship to each other, said slider being linearly coaxially displaceable through said coils, said primary coils being individually excited by reference AC signals having a predetermined phase difference 360°/D except 180° or 360°;

said secondary coils having a between center spacing of P(n±1/D) where n is an integer, and being arranged so that for any position of said slider the outputs of said secondary coils are out of phase by an amount equivalent to the phase difference between said primary coil excitation signals, said secondary coils being connected to produce an output AC signal having an electrical phase indicative of the relative linear position of said slider within the range of one pitch of said cores.

* * * * *